(12) United States Patent
Neo

(10) Patent No.: US 12,488,258 B2
(45) Date of Patent: Dec. 2, 2025

(54) DATA ANALYSIS AND TRAINING DATA, GENERATION DEVICE, SYSTEM, METHOD, AND GENERATION PROGRAM

(71) Applicant: Hitachi, Ltd., Tokyo (JP)

(72) Inventor: Atsushi Neo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 863 days.

(21) Appl. No.: 17/779,367

(22) PCT Filed: Oct. 9, 2020

(86) PCT No.: PCT/JP2020/038295
§ 371 (c)(1),
(2) Date: May 24, 2022

(87) PCT Pub. No.: WO2021/106387
PCT Pub. Date: Jun. 3, 2021

(65) Prior Publication Data
US 2022/0405620 A1      Dec. 22, 2022

(30) Foreign Application Priority Data

Nov. 28, 2019   (JP) ................................ 2019-215695

(51) Int. Cl.
*G06N 5/04*       (2023.01)
*G06T 7/246*      (2017.01)
*G06V 10/764*     (2022.01)

(52) U.S. Cl.
CPC .............. *G06N 5/04* (2013.01); *G06T 7/246* (2017.01); *G06V 10/764* (2022.01); *G06T 2207/10016* (2013.01); *G06T 2207/20081* (2013.01)

(58) Field of Classification Search
CPC ......... G06N 5/04; G06T 7/246; G06V 10/764
See application file for complete search history.

(56) References Cited

U.S. PATENT DOCUMENTS

2006/0018516 A1*  1/2006  Masoud ................. G06T 7/254
                                                                382/115
2016/0098636 A1   4/2016  Okonogi
(Continued)

FOREIGN PATENT DOCUMENTS

| JP | 2012-190159 A   | 10/2012 |
| JP | 2016-076073 A   | 5/2016  |
| WO | WO 2018/089221 A1 | 5/2018 |

OTHER PUBLICATIONS

T. Nakashima and Y. Yabuta, "Object Detection by using Interframe Difference Algorithm," 2018 12th France-Japan and 10th Europe-Asia Congress on Mechatronics, Tsu, Japan, 2018, pp. 98-102, doi: 10.1109/MECATRONICS.2018.8495743. (Year: 2018).*
(Continued)

*Primary Examiner* — Barbara M Level
(74) *Attorney, Agent, or Firm* — Crowell & Moring LLP

(57) ABSTRACT

A generation device executes an inference process of inputting analysis target data to a plurality of inference models and outputting a plurality of inference results related to an object included in the analysis target data from the plurality of inference models, a determination process of determining, based on the plurality of inference results, a specific inference result from the plurality of inference results output by the inference process, and a generation process of generating a training data set including the specific inference result determined by the determination process and the analysis target data.

13 Claims, 14 Drawing Sheets

(56) References Cited

U.S. PATENT DOCUMENTS

| | | | | |
|---|---|---|---|---|
| 2018/0232563 | A1* | 8/2018 | Albadawi | G06F 3/017 |
| 2018/0349639 | A1* | 12/2018 | Ohsaki | G06F 21/6245 |
| 2019/0042850 | A1* | 2/2019 | Jones | G06V 20/40 |
| 2019/0080176 | A1* | 3/2019 | Lan | G06V 20/46 |
| 2019/0095764 | A1* | 3/2019 | Li | G06F 18/24133 |
| 2019/0130216 | A1* | 5/2019 | Tomioka | G06F 18/214 |
| 2019/0392318 | A1* | 12/2019 | Ghafoor | G06V 10/774 |
| 2020/0074227 | A1 | 3/2020 | Lan et al. | |
| 2020/0242400 | A1* | 7/2020 | Perkins | G06V 10/776 |
| 2021/0064925 | A1* | 3/2021 | Shih | G06N 3/084 |

OTHER PUBLICATIONS

International Search Report (PCT/ISA/210) issued in PCT Application No. PCT/JP2020/038295 dated Dec. 28, 2020 with English translation (four (4) pages).

Japanese-language Written Opinion (PCT/ISA/237) issued in PCT Application No. PCT/JP2020/038295 dated Dec. 28, 2020 (four (4) pages).

Extended European Search Report issued in European Application No. 20893600.5 dated Nov. 29, 2023 (15 pages).

Zhou, G. et al., "EDF: Ensembie, Distiii, and Fuse for Easy Video Labellng", Dec. 10, 2018, pp. 1-10, arXiv.org, Cornell University Library, Ithaca, New York, XP080990971 (10 pages).

Xu, Y. et al., "Ensemble One-Dimensional Convolution Neural Networks for Skeleton-Based Action Recognition", IEEE Signal Processing Letters, Jul. 2018, pp. 1044-1048, vol. 25, No. 7, XP093100299 (5 pages).

Cao, Z. et al., "OpenPose: Realtime Multi-Person 2D Pose Estimation using Part Affinity Fields", IEEE Transactions on Pattern Analysis and Machine Intelligence, Dec. 18, 2018, pp. 1-14, XP081364956 (14 pages).

Krawczyk, B. et al., "Ensemble learning for data stream analysis: A survey", Information Fusion, Feb. 3, 2017, pp. 132-156, vol. 37, Elsevier, XP029956720 (26 pages).

* cited by examiner

Fig. 8

| INFERENCE MODEL | FUNCTION | Frame 1 | 2 | ... | n | |
|---|---|---|---|---|---|---|
| 701A | CLASSIFICATION | person | person | | person | |
| | INFERENCE ACCURACY | 0.90 | 0.87 | | 0.70 | } 802A ⎫ |
| | DETECTION START POINT | $(Ax_1^1, Ay_1^1)$ | $(Ax_1^2, Ay_1^2)$ | | $(Ax_1^n, Ay_1^n)$ | } 702A |
| | DETECTION END POINT | $(Ax_2^1, Ay_2^1)$ | $(Ax_2^2, Ay_2^2)$ | | $(Ax_2^n, Ay_2^n)$ | ⎭ |
| | SKELETON DETECTION | Skelton A | Skelton A | | Skelton A | } 801A |
| 701B | CLASSIFICATION | person | person | | person | |
| | INFERENCE ACCURACY | 0.80 | 0.75 | | 0.80 | } 802B ⎫ |
| | DETECTION START POINT | $(Bx_1^1, By_1^1)$ | $(Bx_1^2, By_1^2)$ | | $(Bx_1^n, By_1^n)$ | } 702B |
| | DETECTION END POINT | $(Bx_2^1, By_2^1)$ | $(Bx_2^2, By_2^2)$ | | $(Bx_2^n, By_2^n)$ | ⎭ |
| | SKELETON DETECTION | Skelton B | Skelton B | | Skelton B | } 801B |
| ⋮ | | | | | | |
| 701N | CLASSIFICATION | person | person | | person | |
| | INFERENCE ACCURACY | 0.97 | 0.80 | | 0.56 | } 802N ⎫ |
| | DETECTION START POINT | $(Nx_1^1, Cy_1^1)$ | $(Nx_1^2, Cy_1^2)$ | | $(Nx_1^n, Cy_1^n)$ | } 702N |
| | DETECTION END POINT | $(Nx_2^1, Cy_2^1)$ | $(Nx_2^2, Cy_2^2)$ | | $(Nx_2^n, Cy_2^n)$ | ⎭ |
| | SKELETON DETECTION | Skelton C | Skelton C | | Skelton C | } 801N |

800

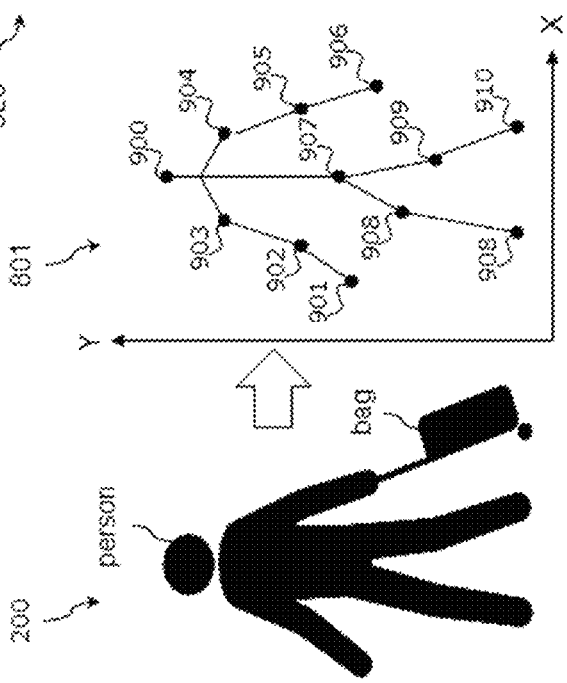

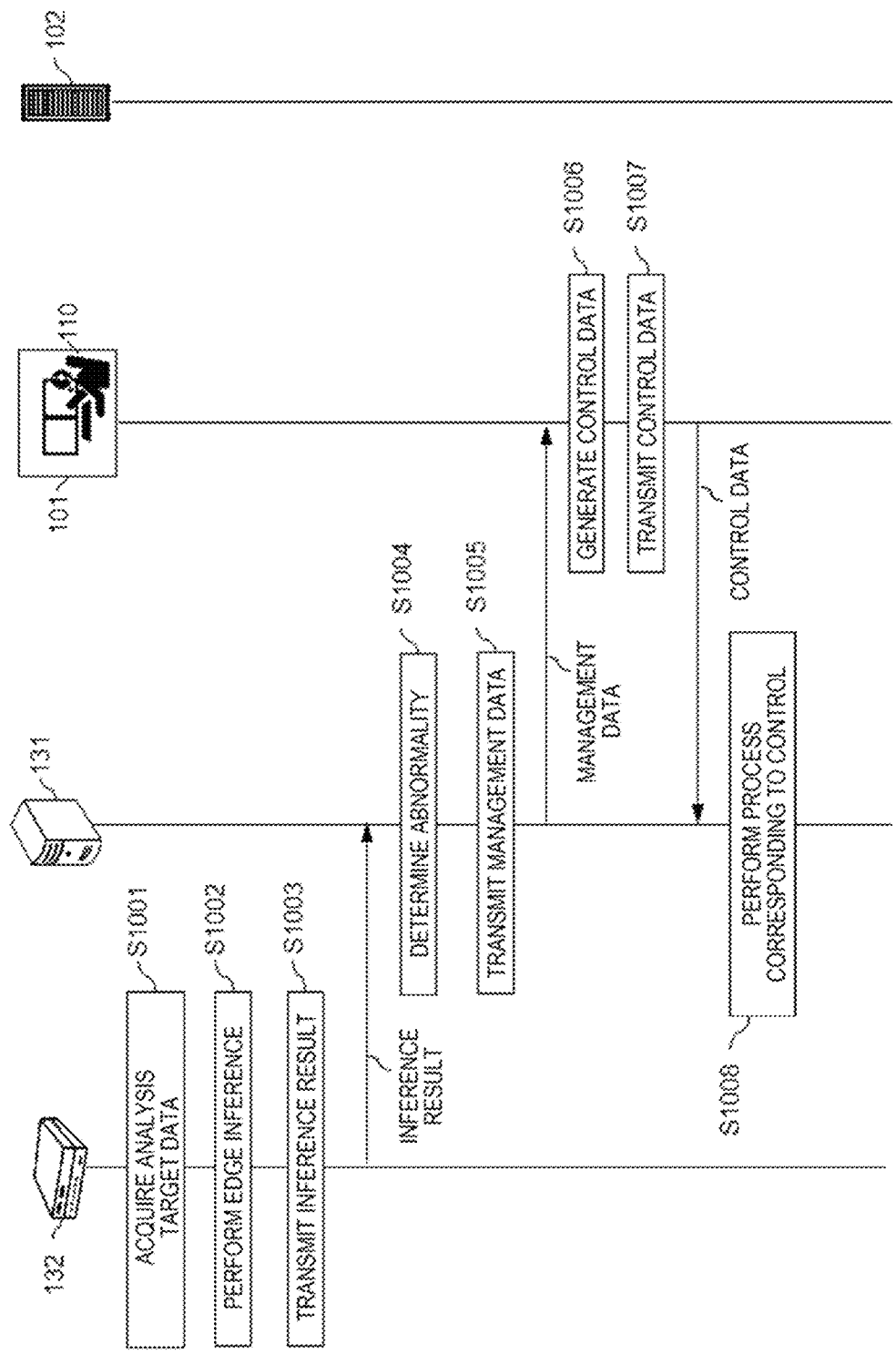

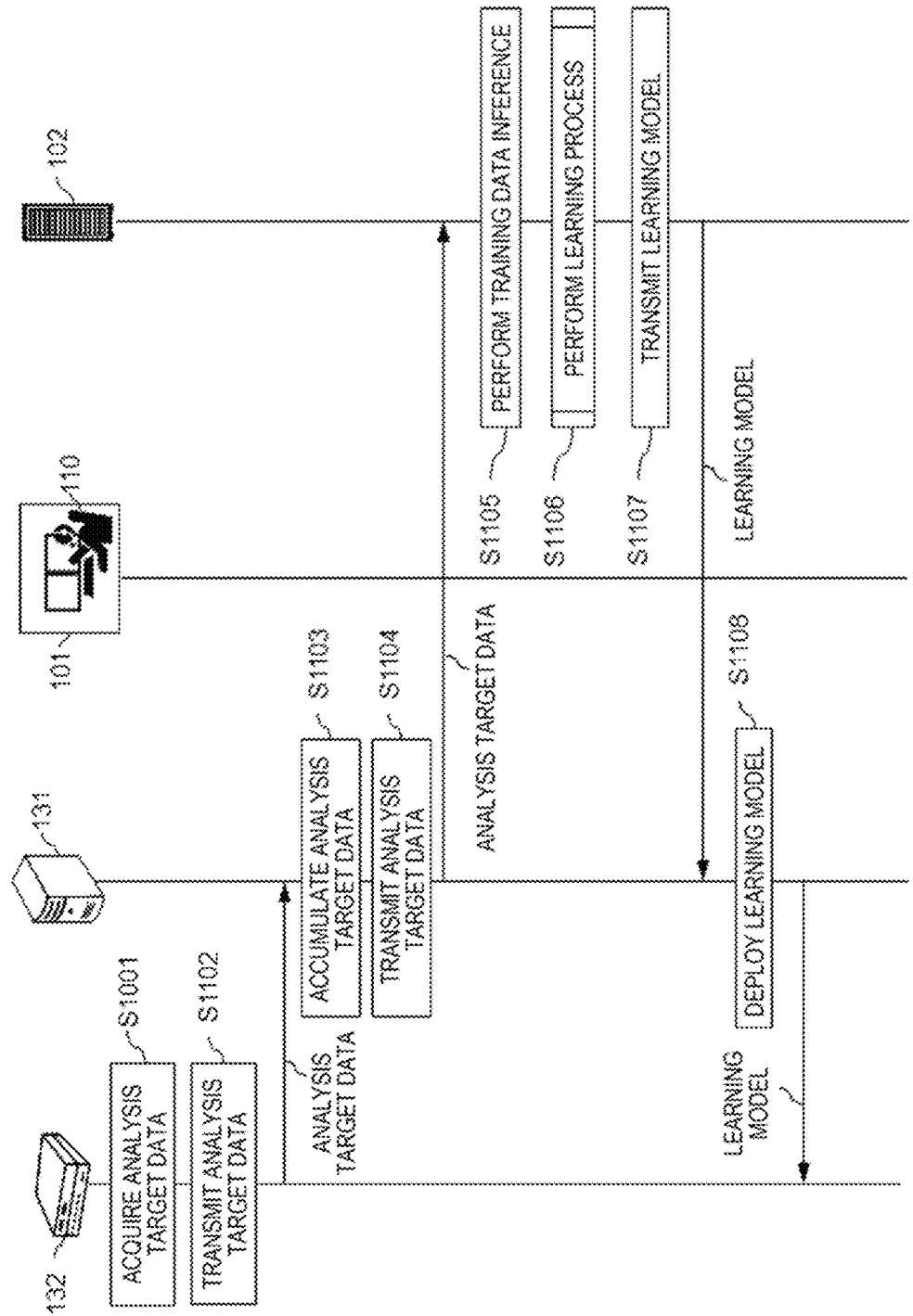

DATA ANALYSIS AND TRAINING DATA, GENERATION DEVICE, SYSTEM, METHOD, AND GENERATION PROGRAM

INCORPORATION BY REFERENCE

The present application claims the priority of Japanese Patent Application No. 2019-215695, which is a Japanese Application filed on Nov. 28, 2019, the disclosure of which is hereby incorporated by reference herein in its entirety.

TECHNICAL FIELD

The present invention relates to a generation device for generating training data, a data analysis system, a generation method, and a generation program.

BACKGROUND ART

The following PTL 1 is provided as a background art in this technical field. A data processing device according to the following PTL 1 includes: a data extracting unit that extracts a training data candidate that is data at a specific timing from time series data; a training data generation unit that generates training data based on a label by which the training data candidate can be classified and the training data candidate; and a training data complement unit that further extracts, based on a degree of change between the specific training data candidate and another training data candidate at a timing before the specific training data candidate in the time series, a training data candidate from the time series data present between the specific training data candidate and the other training data candidate, and the training data generation unit adds a label to the extracted training data candidate, and adds the data to the training data.

CITATION LIST

Patent Literature

PTL1: JP-A-2016-076073

SUMMARY OF INVENTION

Technical Problem

In an image analysis device using machine learning, in general, an enormous amount of training data is required in order to achieve high recognition accuracy. The training data is generated, for example, by adding a manual analysis result to an image to be analyzed, but this method requires a lot of man-hours to generate the training data. For this problem, in the technique described in PTL 1, the quality of the generated training data depends on the recognition accuracy of a training data generation unit, and there is a possibility that the training data having poor quality is generated using the training data generation unit having low accuracy.

An object of the invention is to improve quality of a training data set.

Solution to Problem

A generation device according to one aspect of the invention disclosed in the present application is a generation device including a processor configured to execute a program; and a storage device configured to store the program, in which the processor is configured to execute an inference process of inputting analysis target data to a plurality of inference models and outputting a plurality of inference results related to an object included in the analysis target data from the plurality of inference models, a determination process of determining, based on the plurality of inference results, a specific inference result from the plurality of inference results output by the inference process, and a generation process of generating a training data set including the specific inference result determined by the determination process and the analysis target data.

Advantageous Effect

According to a representative embodiment of the invention, the quality of the training data set can be improved. Problems, configurations, and effects other than those described above will become apparent from the following description of embodiments.

BRIEF DESCRIPTION OF DRAWINGS

FIG. 8 is a diagram illustrating an example of a data structure of inference results for a plurality of frames accumulated in a training data determination unit.

FIGS. 9A and 9B are diagrams illustrating a specific example of a skeleton detection result.

FIG. 10 is a sequence diagram illustrating an operation sequence example 1 of the data analysis system according to the first embodiment.

FIG. 11 is a sequence diagram illustrating an operation sequence example 2 of the data analysis system according to the first embodiment.

DESCRIPTION OF EMBODIMENTS

Figure 1:
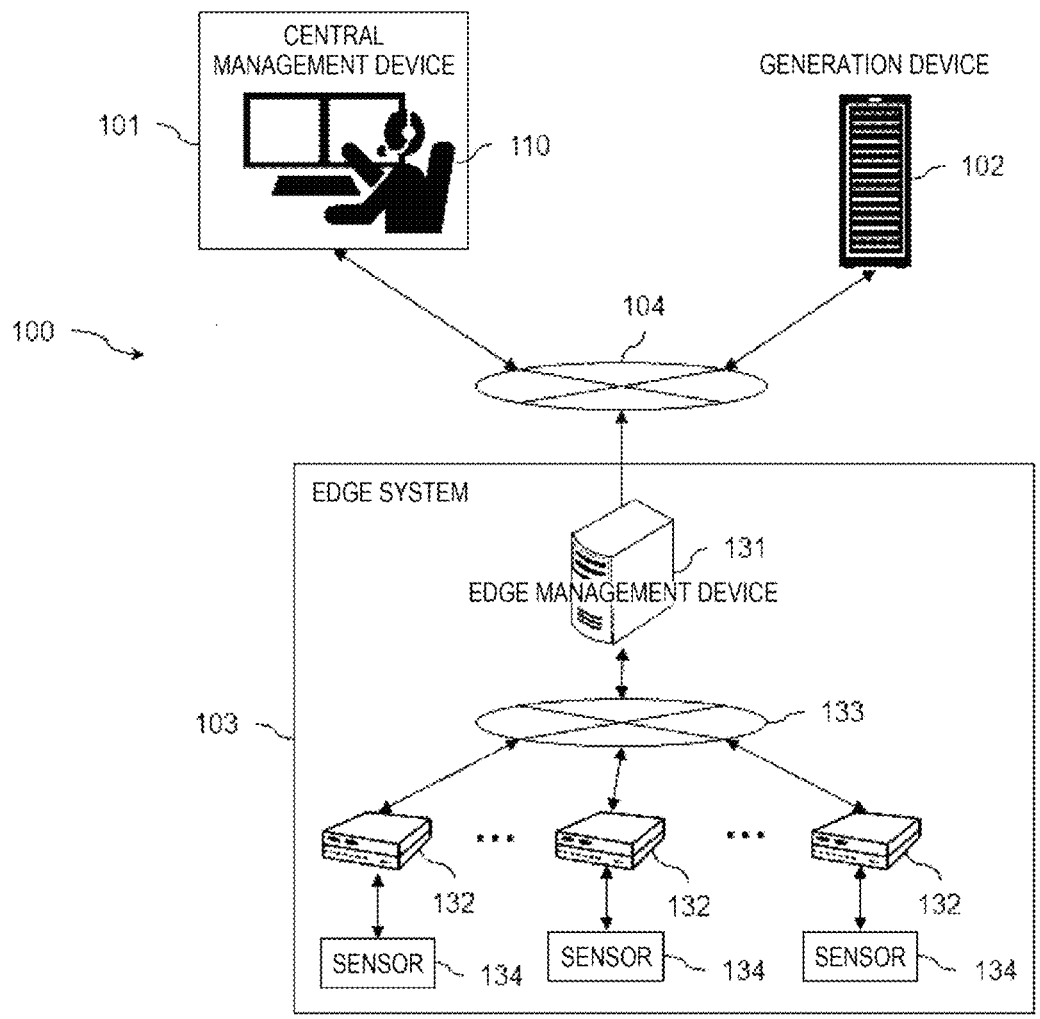
FIG. 1 is a diagram illustrating a system configuration example of a data analysis system according to a first embodiment.

Hereinafter, embodiments of the invention will be described in detail with reference to the drawings. In all the drawings for describing the embodiments, the same components are denoted by the same reference numerals in principle, and repeated description thereof is omitted. In the embodiments described below, it goes without saying that the components (including element steps) are not always indispensable unless otherwise stated or except the case where the components are apparently indispensable in principle. It is needless to say that expressions "formed of A", "made of A", "having A", and "including A" do not exclude elements other than A unless otherwise stated that A is the only element thereof. Similarly, in the embodiments described below, when the shape of the components, positional relation thereof, and the like are mentioned, those substantially approximate and similar shapes and the like are included therein unless otherwise stated or except the case where it can be conceived that they are apparently excluded in principle.

The terms "first", "second", "third", and the like in the present specification are used to identify the components, and do not necessarily limit numbers, orders, or contents thereof. Numbers for identifying the components are used for each context, and the numbers used in one context do not always indicate the same configuration in other contexts. It does not prevent the component identified by a certain number from having a function of a component identified by another number.

In order to facilitate understanding of the invention, a position, a size, a shape, a range, etc. of each configuration illustrated in the drawings may not represent an actual position, size, shape, range, etc. Therefore, the invention is not necessarily limited to the position, size, shape, range, etc. disclosed in the drawings.

First Embodiment

<Data Analysis System>

FIG. 1 is a diagram illustrating a system configuration example of a data analysis system according to a first embodiment. A data analysis system 100 includes a central management device 101, a generation device 102, and one or more edge systems 103. The central management device 101, the generation device 102, and the edge systems 103 can communicate with one another via a network 104 such as a local area network (LAN), a wide area network (WAN), or the internet.

The central management device 101 manages the edge system 103. Specifically, for example, the central management device 101 controls the edge system 103 by transmitting control data to the edge system 103 based on data acquired from the edge system 103. The central management device 101 may control the edge system 103 according to determination of an operator 110. The generation device 102 applies analysis target data from the edge system 103 to a plurality of inference models to infer training data. Then, the generation device 102 generates a learning model by setting, as the training data, an optimal inference result among inference results from the plurality of inference models. The generation device 102 deploys the generated learning model in the edge system 103.

The edge system 103 includes an edge management device 131 and a plurality of edge devices 132. The edge management device 131 manages the plurality of edge devices 132. The edge management device 131 can communicate with the plurality of edge devices 132 via an information control network 133 such as the LAN, the WAN, or the internet. The edge management device 131 is disposed in an analysis environment in which the analysis target data is acquired, and the edge device 132 is disposed in a specific location in the analysis environment. The analysis environment is, for example, a factory or a train.

The edge device 132 includes a sensor 134. The sensor 134 detects the analysis target data from the analysis environment. The sensor 134 is, for example, a camera that images a still image or a moving image. The sensor 134 may detect a voice or an odor. The edge device 132 acquires the analysis target data detected by the sensor 134 from the sensor 134, and transmits the analysis target data to the edge management device 131.

The edge device 132 infers the analysis target data by inputting the analysis target data to the learning model deployed by the generation device 102, and transmits an inference result to the edge management device 131. When the analysis environment is the factory, the edge management device 131 can be applied to work monitoring of a worker in the factory, defect inspection of a product, and the like by using the inference result. When the analysis environment is the train, the edge management device 131 can be applied to monitoring of passengers in a train, monitoring of in-vehicle equipment, detection of disaster such as fire, and the like by using the inference result.

The edge device 132 transmits the analysis target data to the generation device 102 via the edge management device 131. Accordingly, the generation device 102 can apply the analysis target data from the edge system 103 to the plurality of inference models to infer the training data.

The central management device 101, the generation device 102, the edge management device 131, and at least two of the edge devices 132 may be implemented by one computer. For each of functions of the central management device 101, the generation device 102, the edge management device 131, and the edge device 132, a process of the function may be executed by each of the plurality of computers.

<Hardware Configuration Example of Computer>

Figure 2:
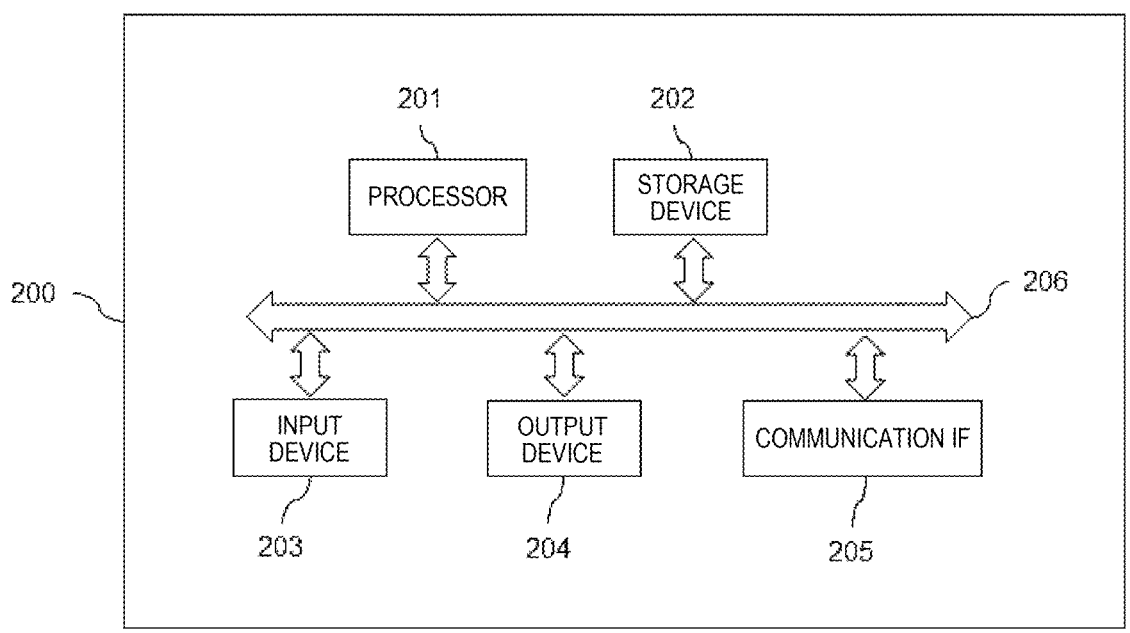
FIG. 2 is a block diagram illustrating a hardware configuration example of a computer.

FIG. 2 is a block diagram illustrating a hardware configuration example of the computer (the central management device 101, the generation device 102, the edge management device 131, and the edge devices 132). A computer 200 includes a processor 201, a storage device 202, an input device 203, an output device 204, and a communication interface (communication IF) 205. The processor 201, the storage device 202, the input device 203, the output device 204, and the communication IF 205 are connected by a bus 206. The processor 201 controls the computer 200. The storage device 202 serves as a work area of the processor 201. The storage device 202 is a non-transitory or transitory recording medium that stores various programs and data. Examples of the storage device 202 include a read only memory (ROM), a random access memory (RAM), a hard disk drive (HDD), and a flash memory. The input device 203 inputs data. Examples of the input device 203 include a keyboard, a mouse, a touch panel, a numeric keypad, and a scanner. The output device 204 outputs the data. Examples of the output device 204 include a display, and a printer. The communication IF 205 is connected to a network and transmits and receives the data.

<Analysis Environment>

Figure 3:
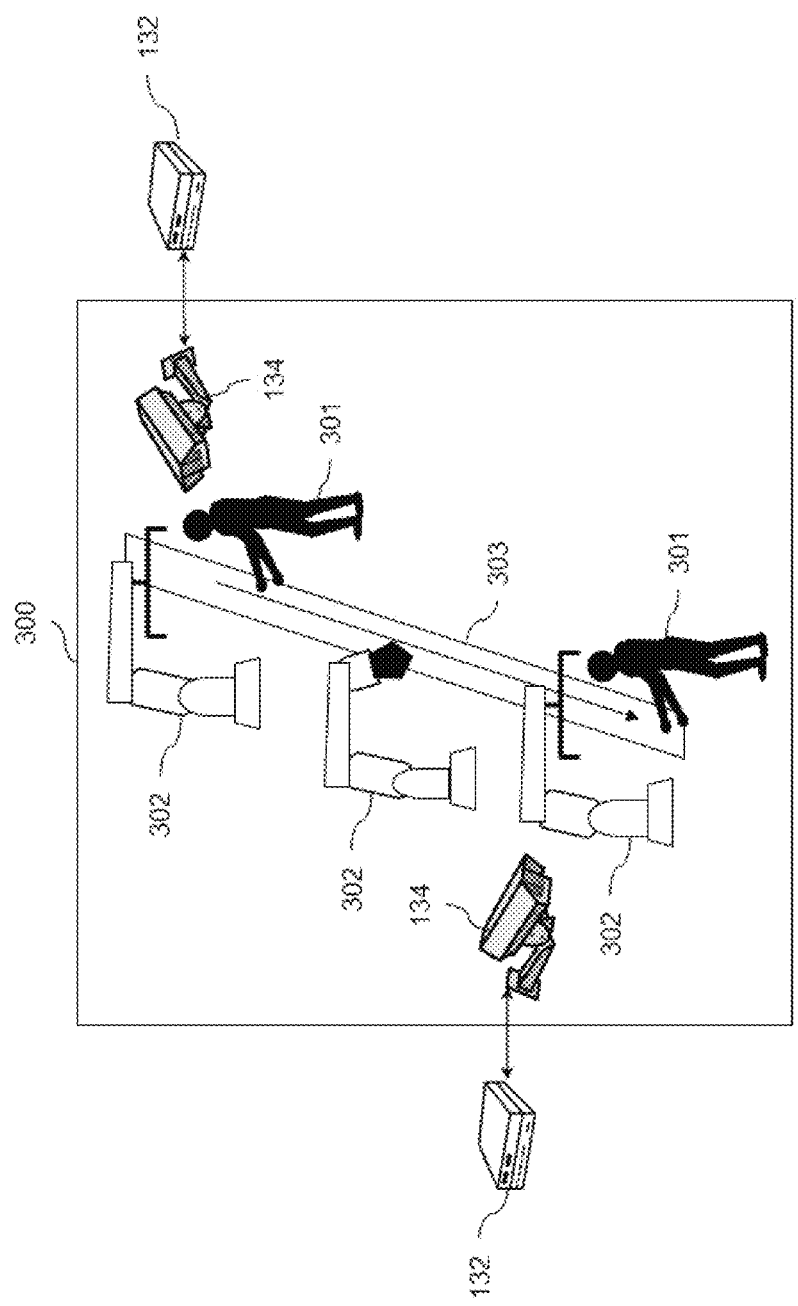
FIG. 3 is a diagram illustrating an analysis environment example 1.

FIG. 3 is a diagram illustrating an analysis environment example 1. The analysis environment example 1 is in a factory 300. For example, workers 301, work robots 302, and a work lane 303 are in the factory 300. A monitoring camera (hereinafter, referred to as a monitoring camera 134) also exists as an example of the sensor 134.

The monitoring camera 134 images the workers 301, the work robots 302, and the work lane 303 in the factory 300. The monitoring camera 134 transmits an imaged still image or moving image of the factory 300 as the analysis target data to the edge device 132 at a connection destination. The edge device 132 infers the analysis target data, and transmits the inference result to the edge management device 131 together with an imaging time of the analysis target data. Accordingly, the edge management device 131 can perform the work monitoring of the worker and the defect inspection of the product in the factory 300 by using the inference result.

Figure 4:
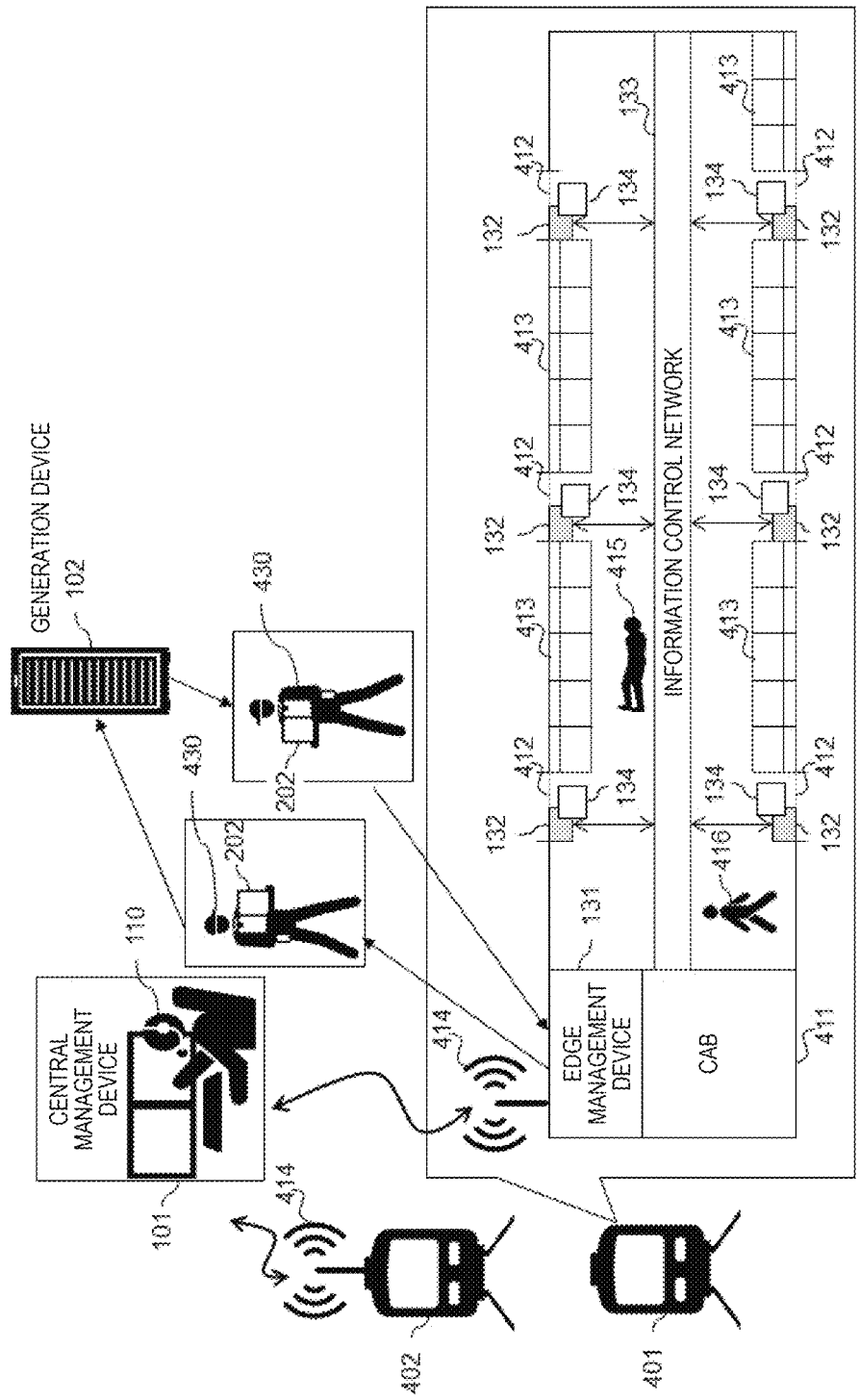
FIG. 4 is a diagram illustrating an analysis environment example 2.

FIG. 4 is a diagram illustrating an analysis environment example 2. The analysis environment example 2 is in a train 401. The train 401 (the same applies to another train 402) includes a cab 411 for operating the train 401, entrances 412, seats 413, the edge management device 131, the edge devices 132, a wireless transceiver 414, the information control network 133, and the monitoring cameras 134. The wireless transceiver 414 communicably connects the edge management device 131 and another train 402 or the central management device 101.

The monitoring camera 134 transmits an imaged still image or moving image of the train 401 as the analysis target data to the edge device 132 at the connection destination. The edge device 132 infers the analysis target data, and transmits the inference result to the central management device 101 together with an imaging time of the analysis target data via the edge management device 131.

Based on the inference result, the edge management device 131 can determine, for example, an abnormality in the train 401, such as falling of a person 415 in the train 401, and can notify a crew member 416 in the train 401 of a judgment result by a speaker in the train 401 or notify a terminal carried by the crew member 416 of the judgment result. The crew member 416 who receives the notification will take appropriate measures such as rescue. From the inference result, the edge management device 131 determines, for example, a possibility of the rescue in which another train 402 needs to stop, and transmits management data indicating the determination result to the central management device 101.

Based on the determination result, the central management device 101 specifies another train 402 that needs to be stopped, and transmits control data for stopping the train to the edge management device 131 of the specified another train 402. The edge management device 131 in the other train 402 notifies the crew member 416 of the stop of the operation or executes the control of stopping the operation of the other train 402.

The central management device 101 may automatically generate the control data for stopping the train based on the determination result, and may generate the control data for stopping the train according to determination of the operator 110 as a result of displaying the judgment result.

The inference result from the edge device 132 and a determination target of the edge management device 131 are not limited to necessity of the rescue, and may be, for example, troubles such as a fight between passengers in the train 401, a damage to train parts such as windows and the entrances, and a fire in the train 401, and the like.

A communication band of the wireless transceiver 414 may be lower than a predetermined band. In such a case, instead of the communication between the edge management device 131 and the generation device 102, data in the edge management device 131 is stored in the portable storage device 202, and a maintenance worker 430 carries the storage device 202 and connects the storage device 202 to the generation device 102. Similarly, data in the generation device 102 is stored in the portable storage device 202, and the maintenance worker 430 carries the storage device 202 and connects the storage device 202 to the edge management device 131.

However, in a case where the communication band of the wireless transceiver 414 is equal to or greater than the predetermined band, data transmission and reception using the wireless transceiver 414 may be executed instead of carrying the storage device 202 by the maintenance worker 430.

Similarly, in a case where a dedicated high-speed communication path can be constructed when the train 401 enters a garage, when the train 401 is maintained, or when the train 401 stops at a station, the data transmission and reception using the wireless transceiver 414 may be executed instead of carrying the storage device 202 by the maintenance worker 430. An application destination of the edge system 103 is not limited to only the train 401, and may be applied to other moving means such as a bus, an airplane, and a ship.

<Functional Configuration Example of Edge System 103>

Figure 5:
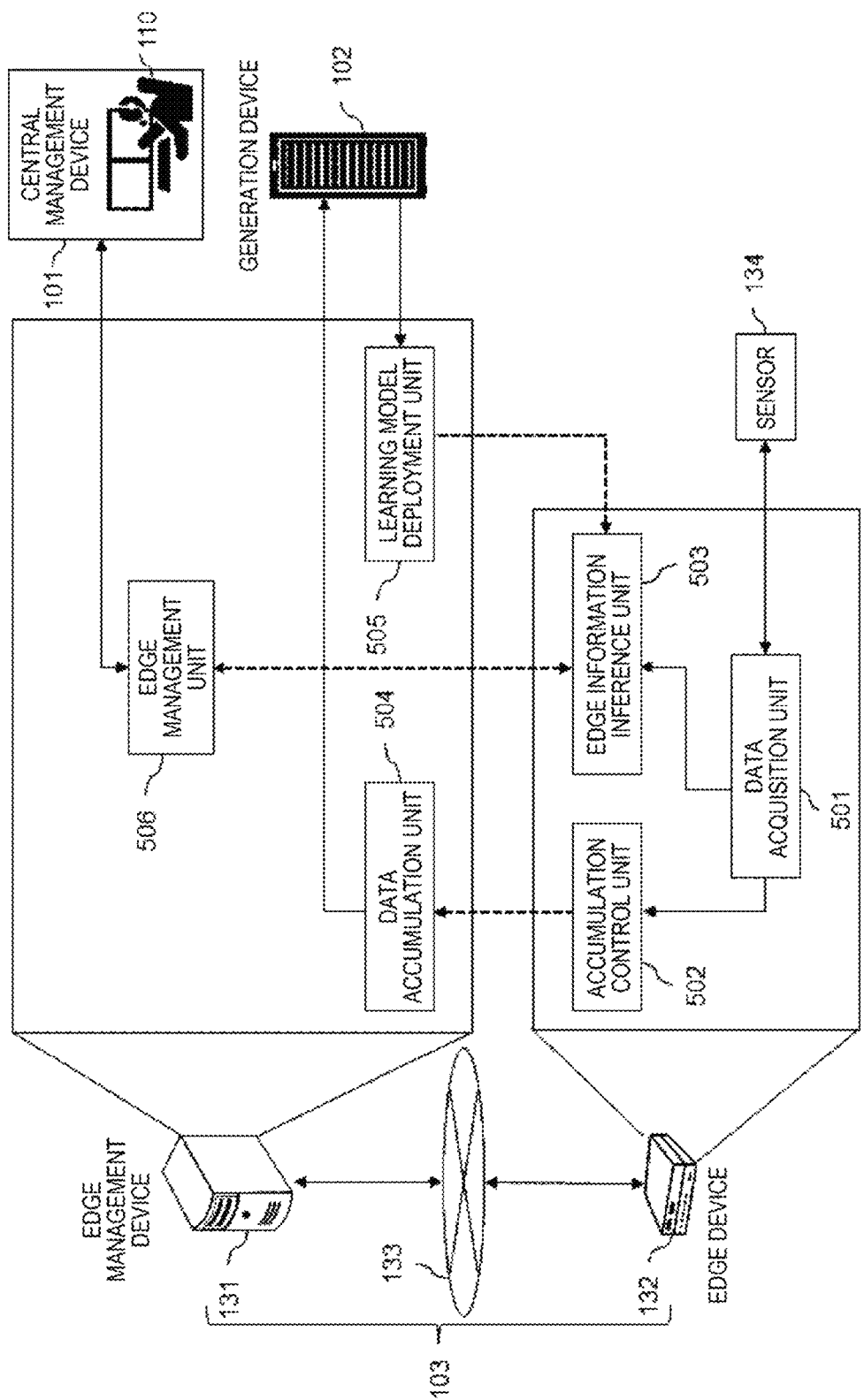
FIG. 5 is a block diagram illustrating a functional configuration example of an edge system according to the first embodiment.

FIG. 5 is a block diagram illustrating a functional configuration example of the edge system 103 according to the first embodiment. The edge device 132 includes a data acquisition unit 501, an accumulation control unit 502, and an edge information inference unit 503. Specifically, the data acquisition unit 501, the accumulation control unit 502, and the edge information inference unit 503 are, for example, functions implemented by causing the processor 201 to execute the programs stored in the storage device 202.

The data acquisition unit 501 acquires the analysis target data detected by the sensor 134. The data acquisition unit 501 outputs the acquired analysis target data to the accumulation control unit 502 and the edge information inference unit 503.

The accumulation control unit 502 performs capacity compression or encryption on the analysis target data to convert the analysis target data into a predetermined format. For example, if the analysis target data is a moving image, the accumulation control unit 502 converts the analysis target data into a format of moving image in unit of a frame, and if the analysis target data is a still image, the accumulation control unit 502 converts the analysis target data into a format of a still image of one frame. In the conversion, the accumulation control unit 502 may add an acquisition time of the analysis target data to the analysis target data. The accumulation control unit 502 transmits the analysis target data to a data accumulation unit of the edge management device 131 via the information control network.

The accumulation control unit 502 may manage a use capacity of the edge device 132 in a data accumulation unit 504, and when the use capacity reaches a predetermined capacity, the accumulation control unit 502 may execute a process of stopping accumulation of new data or a process of deleting data with an oldest acquisition time in order.

The edge information inference unit 503 infers an object and an action of the object from the analysis target data, and transmits the inference result to an edge management unit 506 via the information control network 133. The inference of the edge information inference unit 503 is executed by inputting the analysis target data to the learning model deployed by the generation device 102. The edge information inference unit 503 may transmit the inference result to the data accumulation unit 504 via the information control network 133.

The edge management device 131 includes the data accumulation unit 504, a learning model deployment unit 505, and the edge management unit 506. Specifically, the data accumulation unit 504, the learning model deployment unit 505, and the edge management unit 506 are, for example, functions implemented by causing the processor 201 to execute the programs stored in the storage device 202.

The data accumulation unit 504 accumulates, in the storage device 202, the analysis target data output from the accumulation control unit 502 and the inference result output from the edge information inference unit 503. The data accumulation unit 504 transmits the accumulated data to the generation device 102.

A communication path between the edge management device 131 and the generation device 102 is formed in real time, and the data accumulated in the data accumulation unit 504 is transmitted to the generation device 102 through the communication path. The communication path between the edge management device 131 and the generation device 102 allows communication only in a certain period of time, and during this period of time, the data accumulated in the data accumulation unit 504 may be collectively transmitted to the generation device 102.

When the communication path between the edge management device 131 and the generation device 102 is not formed, the maintenance worker 430 may remove the storage device 202 connected to the data accumulation unit 504, carry the storage device 202 to the generation device 102, and connect the storage device 202 to the generation device 102. In this case, the maintenance worker 430 connects another storage device 202 to the data accumulation unit 504.

The learning model deployment unit 505 outputs the learning model generated by the generation device 102 to the edge information inference unit 503 via the information control network 133, and deploys the learning model as an inference model. Accordingly, the edge information inference unit 503 can infer a current object and an action of the object from the analysis target data from the sensor 134 by using the newly deployed inference model.

The edge management unit 506 determines the abnormality of the above analysis environments based on the inference result from the edge information inference unit 503. When it is determined that there is an abnormality, the edge management unit 506 transmits the management data indicating that there is an abnormality to the central management device 101. Further, the edge management unit 506 executes a process corresponding to the control data from the central management device 101. For example, as described above, the edge management unit 506 notifies the crew member of the stop of the train or executes the control of stopping the operation.

<Functional Configuration Example of Generation Device 102>

Figure 6:
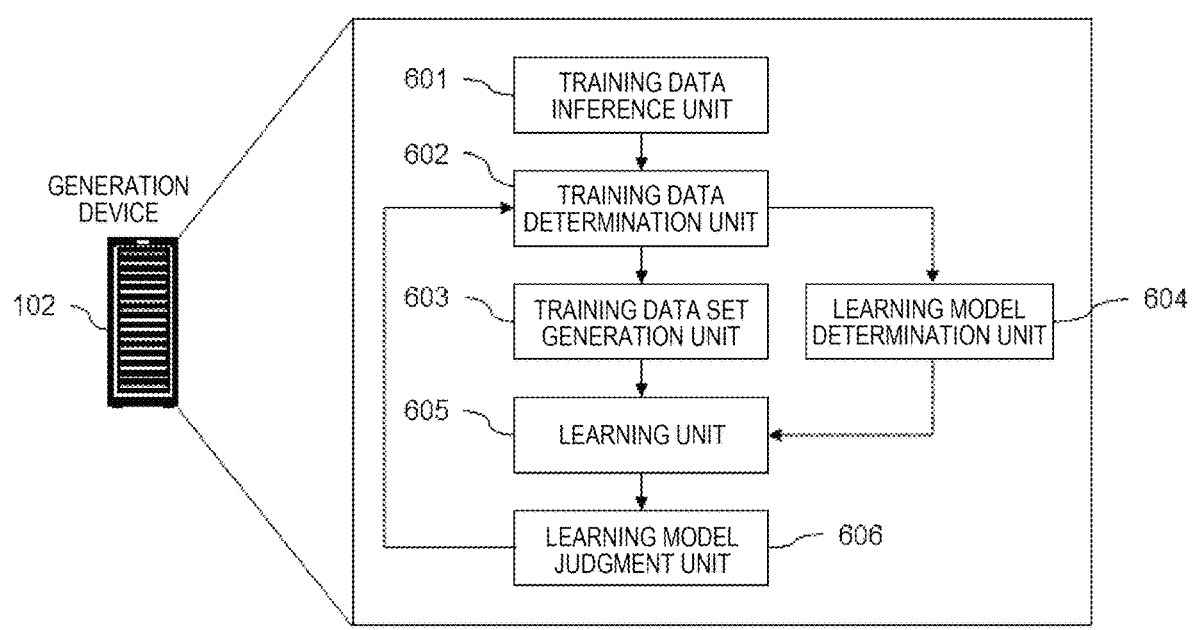
FIG. 6 is a block diagram illustrating a functional configuration example of a generation device according to the first embodiment.

FIG. 6 is a block diagram illustrating a functional configuration example of the generation device 102 according to the first embodiment. The generation device 102 includes a training data inference unit 601, a training data determination unit 602, a training data set generation unit 603, a learning model determination unit 604, a learning unit 605, and a learning model judgment unit 606.

Specifically, for example, the training data inference unit 601, the training data determination unit 602, the training data set generation unit 603, the learning model determination unit 604, the learning unit 605, and the learning model judgment unit 606 are functions implemented by causing the processor 201 to execute the programs stored in the storage device 202.

The training data inference unit 601 inputs the analysis target data to each of a plurality of trained inference models 701 prepared in advance, and outputs an inference result 702 from each of the plurality of inference models 701 to the training data determination unit 602. Details of the training data inference unit 601 will be described later with reference to FIG. 7.

The training data determination unit 602 determines whether each of the plurality of inference results 702 from the training data inference unit 601 is appropriate as the training data, and outputs a specific inference result 702 determined to be appropriate to the training data set generation unit 603 as the training data. Further, the training data determination unit 602 outputs the specific inference model 701 that is a generation source of the training data to the learning model determination unit 604. Details of the training data determination unit 602 will be described later with reference to FIGS. 7 and 8.

The training data set generation unit 603 aggregates the training data sequentially received from the training data determination unit 602, and outputs the aggregated training data as a training data set to the learning unit 605. Details of the training data set generation unit 603 will be described later with reference to FIG. 7.

The learning model determination unit 604 determines a specific inference model (hereinafter, referred to as a learning model) to be output to the learning unit 605 from the plurality of specific inference models sequentially received from the training data determination unit 602. Details of the learning model determination unit 604 will be described later with reference to FIG. 7.

For example, the learning unit 605 trains the learning model, such that the training data set can be inferred, through machine learning such as deep learning by using the training data set generated by the training data set generation unit 603 and the learning model determined by the learning model determination unit 604, and the learning unit 605 outputs the learning model to the learning model judgment unit 606.

A function for outputting an error between the specific inference result of the training data set and a new inference result obtained from the specific inference model 701 during learning using the training data set is a loss function. The learning unit 605 repeats learning such that the loss function decreases. The learning unit 605 also outputs the loss function to the learning model judgment unit 606.

The learning model judgment unit 606 holds test data that is not used in training in the learning unit 605. The learning model judgment unit 606 judges the pass/fail of the learning model by using inference accuracy of the learning model using the test data and the loss function using the test data. When the learning model passes, the learning model judgment unit 606 outputs the learning model to the learning model deployment unit 505 of the edge management device 131.

Specifically, for example, the learning model judgment unit 606 judges whether the inference accuracy included in a learning result output from the learning model when the test data is input to the learning model is equal to or higher than predetermined inference accuracy. If the inference accuracy is equal to or higher than the predetermined inference accuracy, the learning model judgment unit 606 judges that the learning model passes, and outputs the learning model to the learning model deployment unit 505 of the edge management device 131.

The learning model judgment unit 606 judges whether a value of the loss function, which uses the inference result obtained when the analysis target data is input to the learning model and the learning result obtained when the test data is input to the learning model, is equal to or less than a predetermined threshold value. If the value is equal to or less than the predetermined threshold value, the learning model judgment unit 606 judges that the learning model passes, and outputs the learning model to the learning model deployment unit 505 of the edge management device 131.

The learning model judgment unit 606 may use at least one of the inference accuracy of the learning model using the test data, and the loss function. When both of the inference accuracy of the learning model using the test data, and the loss function are used by the learning model judgment unit 606, if the inference accuracy included in the learning result output from the learning model when the test data is input to the learning model is equal to or higher than the predetermined inference accuracy, and the value of the loss function described above is equal to or less than the predetermined threshold value, the learning model judgment unit 606 may judge that the learning model passes, and output the learning model to the learning model deployment unit 505 of the edge management device 131.

Further, when both of the inference accuracy of the learning model using the test data, and the loss function are used by the learning model judgment unit 606, if the inference accuracy included in the learning result output from the learning model when the test data is input to the learning model is equal to or higher than the predetermined inference accuracy, or the value of the loss function described above is equal to or less than the predetermined threshold value, the learning model judgment unit 606 may judge that the learning model passes, and output the learning model to the learning model deployment unit 505 of the edge management device 131.

If the learning model does not pass, the learning model judgment unit 606 outputs data indicating that fact. In this case, the training data determination unit 602 determines whether each of the plurality of pieces of training data from the training data inference unit 601 is appropriate as training data by a method different from a method used in the previous determination.

Specifically, as another method, for example, the learning model judgment unit 606 may input new analysis target data 700 to the training data inference unit 601 and instruct the training data inference unit 601 to infer the training data.

As another method, the learning model judgment unit 606 may instruct the training data determination unit 602 to change a derivation method of training data 703. Specifically, for example, by making a movement amount Ldis of the following formulas (1A) to (1N) smaller, the training data 703 in which movement amounts Adis to Ndis is equal to or greater than the predetermined movement amount Ldis, and such an object detection result 802 is excluded as inappropriate as the training data 703. Therefore, highly accurate training data 703 can be obtained.

Figure 7:
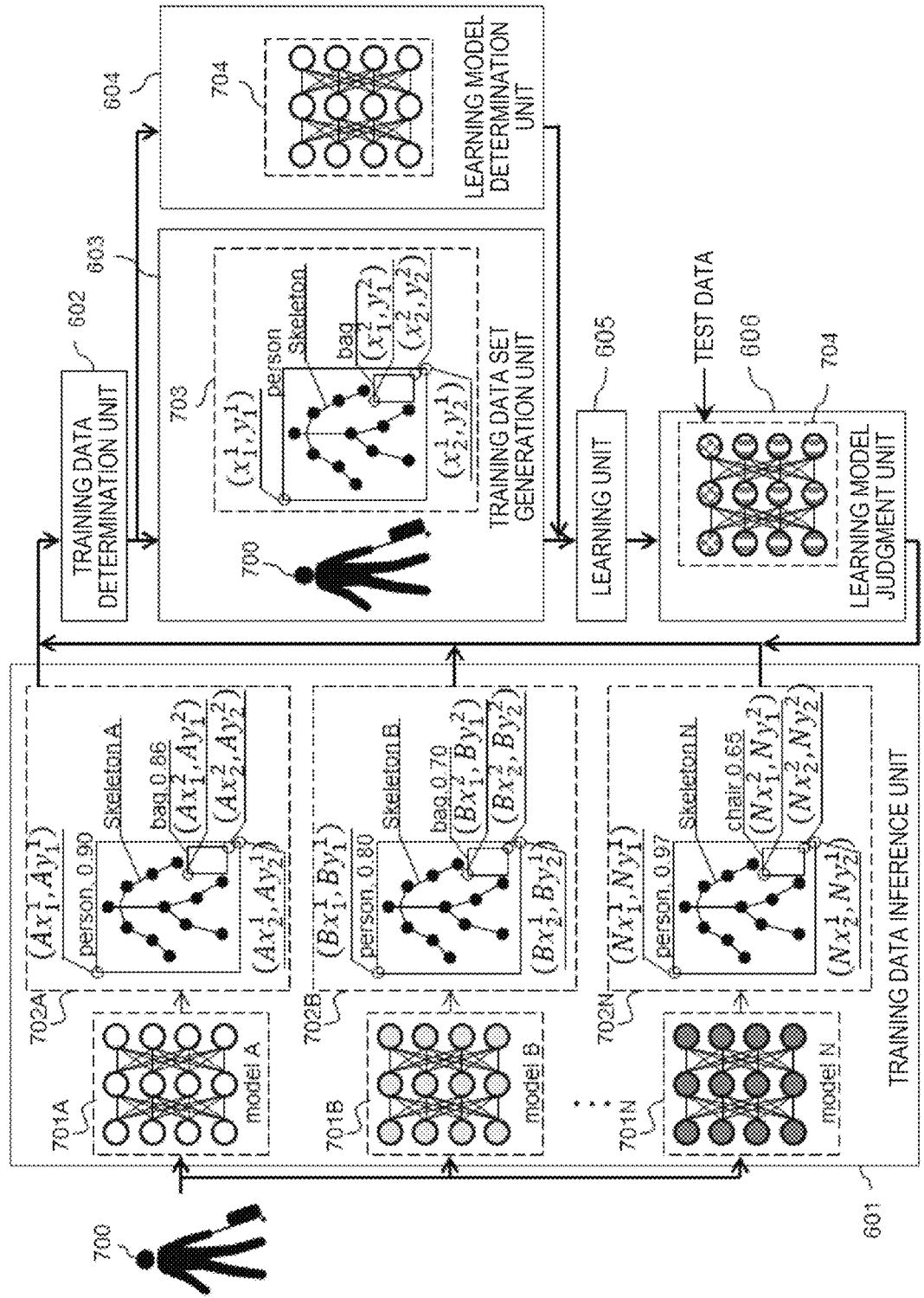
FIG. 7 is a diagram illustrating an operation example of the generation device according to the first embodiment.

The learning model determination unit 604 outputs, as a learning model 704, a specific inference model, that outputs a largest amount of training data 703 among inference models 701A to 701N illustrated in FIG. 7, to the learning unit 605. Therefore, in another method, when the learning model 704 does not satisfy the predetermined inference accuracy, the learning model judgment unit 606 may instruct the learning model determination unit 604 to output the specific inference model that outputs a next largest amount of training data 703 to the learning unit 605 as the learning model 704, as another method.

As another method, the learning model determination unit 604 may change the predetermined inference accuracy. For example, when there is no learning model that satisfies the predetermined inference accuracy, the learning model judgment unit 606 lowers the predetermined inference accuracy. When there is a predetermined number or more of learning models that satisfy the predetermined inference accuracy, the learning model judgment unit 606 may increase the predetermined inference accuracy to limit the number of learning models that satisfy the predetermined inference accuracy.

The communication path between the edge management device 131 and the generation device 102 is formed in real time, and the data from the generation device 102 is transmitted to the edge management device 131 through the communication path. The communication path between the edge management device 131 and the generation device 102 allows communication only in a certain period of time, and during this period of time, the data from the generation device 102 may be collectively transmitted to the edge management device 131.

When the communication path between the edge management device 131 and the generation device 102 is not formed, the maintenance worker 430 may remove the storage device 202 connected to the generation device 102, carry the storage device 202 to the edge management device 131, and connect the storage device 202 to the edge management device 131. In this case, the maintenance worker 430 connects another storage device 202 to the generation device 102.

<Operation Example of Generation Device 102>

FIG. 7 is a diagram illustrating an operation example of the generation device 102 according to the first embodiment. The analysis target data 700 is, for example, an image frame detected by the sensor 134, transmitted via the edge device 132, the information control network 133, and the edge management device 131, and received by the generation device 102. The analysis target data 700 is input to the training data inference unit 601.

The training data inference unit 601 holds the plurality of trained inference models 701A to 701N prepared in advance. Each of the inference models 701A to 701N is, for example, a model obtained by combining a skeleton detection model for inferring a shape of an object reflected in the analysis target data 700 (for example, a skeleton if the object is a person. Hereinafter, the shape of the object is referred to as "skeleton" regardless of whether the object is a person or an object) and an object detection model for detecting the object reflected in the analysis target data 700. However, the inference models 701A to 701N are not limited to such a model.

Functions of the inference models 701A to 701N are the same, but algorithms used for inference, such as the number of stages of neural networks, are different from one another. Therefore, inference results 702A to 702N and inference accuracy output together with the inference results 702A to 702N may be different from one another. When the inference models 701A to 701N are not distinguished from one another, the inference models 701A to 701N are simply referred to as the inference model 701.

The analysis target data 700 is input to the inference models 701A to 701N, and the training data inference unit 601 outputs the inference results 702A to 702N from the inference models 701A to 701N. When the inference results 702A to 702N are not distinguished from one another, the inference results 702A to 702N are simply referred to as the inference result 702. Each of the inference results 702A to 702N includes a skeleton detection result and an object detection result. The training data inference unit 601 outputs the inference results 702A to 702N to the training data determination unit 602.

The training data determination unit 602 determines whether each of the plurality of inference results 702A to 702N inferred by the training data inference unit 601 is appropriate as the training data, and outputs the specific inference result 702 determined to be appropriate to the training data set generation unit 603 as the training data 703. The details of the training data determination unit 602 will be described later with reference to FIG. 8.

The training data set generation unit 603 generates the training data set by associating the analysis target data 700 with the training data 703. Each time the analysis target data 700 is input to the generation device 102, the training data set generation unit 603 generates a training data set and adds the training data set to the training data set generated so far. The training data set generation unit 603 outputs the aggregated training data set to the learning unit 605.

The learning model determination unit 604 determines the learning model 704 from the plurality of inference models 701 sequentially received from the training data determination unit 602. Specifically, for example, the learning model determination unit 604 outputs, as the learning model 704, the specific inference model 701, that outputs the largest amount of training data 703 (specific inference results 702) among the inference models 701A to 701N, to the learning unit 605. That is, the inference model 701 having the largest number of outputs of the training data 703 (specific inference results 702) is determined as the specific inference model 701. The specific inference model 701 is not limited to the inference model 701 having the largest number of outputs, and the learning model determination unit 604 may determine any one of the inference models 701 of which the number of outputs is not the minimum, as the specific inference model 701.

The learning model determination unit 604 may output, as the learning model 704, the specific inference model 701 that outputs the largest amount of training data 703 among the inference models 701A to 701N having a determined number of stages of neural networks, to the learning unit 605. The learning model determination unit 604 may output a predetermined inference model 701 to the learning unit 605 as the learning model 704.

<Operation Example of Training data Determination Unit 602>

Next, an operation example of the training data determination unit 602 will be described with reference to FIGS. 8 to 10. The training data determination unit 602 determines whether each of the plurality of inference results 702A to 702N inferred by the training data inference unit 601 is appropriate as the training data, and outputs the specific inference result 702 determined to be appropriate to the training data set generation unit 603 as the training data 703.

FIG. 8 is a diagram illustrating an example of a data structure of the inference results 702 for a plurality of frames accumulated in the training data determination unit 602. In the example of FIG. 8, an example in which n frames as the analysis target data 700 are processed for each inference model 701 is illustrated.

A data structure 800 includes skeleton detection results 801A to 801N and object detection results 802A to 802N for each frame for each inference model 701. When the skeleton detection results 801A to 801N are not distinguished from one another, the skeleton detection results 801A to 801N are simply referred to as a skeleton detection result 801. Similarly, when the object detection results 802A to 802N are not distinguished from one another, object detection results 802A to 802N are simply referred to as the object detection result 802.

The skeleton detection result 801 is data indicating a skeleton of an object in the analysis target data 700. Specifically, for example, "Skelton A" to "Skelton N" in the inference results 702A to 702N illustrated in FIG. 7 are the skeleton detection results 801A to 801N.

FIG. 9 is a diagram illustrating a specific example of the skeleton detection result 801. The skeleton detection result 801 is, for example, a skeleton data group of the object detected from the analysis target data 700. (A) of FIG. 9 illustrates the skeleton detection result 801 of an object of a type "person". The skeleton detection result 801 includes a plurality of (eleven as an example of FIG. 9) skeleton points 900 to 910. (B) is a data structure 920 of the skeleton detection result 801 showing X-axis coordinate values 921, Y-axis coordinate values 922, and inference accuracy 923 of the skeleton points 900 to 910.

Returning to FIG. 8, the object detection result 802 includes a classification indicating the type of the detected object, inference accuracy of the object in the classification, a detection start point and a detection end point indicating a position of the detected object, among the analysis target data 700. Specifically, for example, "person" and "bag" in the inference result 702A illustrated in FIG. 7 are classifications, "0.90" is inference accuracy of "person", "0.86" is inference accuracy of "bag", $(Ax_1^1, Ay_1^1)$ is a detection start point of "person", $(Ax_1^2, Ay_1^2)$ is a detection start point of "bag", $(Ax_2^1, Ay_2^1)$ is a detection end point of "person", and $(Ax_2^2, Ay_2^2)$ is a detection end point of "bag".

Next, a method of deriving the training data 703 using the object detection result 802 will be described. The training data determination unit 602 calculates the movement amounts Adis to Ndis of the object detected between frames according to the following formulas (1A) to (1N) by using the detection start points and the detection end points among the object detection result 802, and compares the calculated movement amounts Adis to Ndis with the predetermined movement amount Ldis.

[Formula 1]

$$A\text{dis}=(Ax_1^1|_{frame=n-1}-Ax_1^1|_{frame=n})^2+ \\ (Ay_1^1|_{frame=n-1}-Ay_1^1|_{frame=n})^2 < L\text{dis} \quad (1A)$$

$$B\text{dis}=(Bx_1^1|_{frame=n-1}-Bx_1^1|_{frame=n})^2+ \\ (By_1^1|_{frame=n-1}-By_1^1|_{frame=n})^2 < L\text{dis} \quad (1B)$$

$$N\text{dis}=(Nx_1^1|_{frame=n-1}-Nx_1^1|_{frame=n})^2+ \\ (Ny_1^1|_{frame=n-1}-Ny_1^1|_{frame=n})^2 < L\text{dis} \quad (1N)$$

If the movement amounts Adis to Ndis are smaller than the movement amount Ldis, the training data determination unit 602 stores the object detection result 802 as a candidate of the training data 703 to be output to the training data set generation unit 603. Meanwhile, if the movement amounts Adis to Ndis are equal to or greater than the predetermined movement amount Ldis, the training data 703 is determined to be inappropriate, and the object detection result 802 is excluded.

In the formulas (1A) to (1N), the training data determination unit 602 calculates the movement amount between the adjacent frames, and may calculate movement amount between frames by using detection start points and detection end points in several previous frames. The training data determination unit 602 may average the movement amounts Adis to Ndis by using the detection start points and the detection end points of the plurality of frames. Accordingly, the method of calculating the movement amounts Adis to Ndis between frames is not limited.

When the classification of the inference result 702 is different between the inference models 701, for example, the training data determination unit 602 may determine that the object detection result 802 indicating a classification of a minority is inappropriate as the training data, and exclude the object detection result 802.

When any of the classifications of the inference result 702 of the inference model 701 is less than or equal to a predetermined number, the training data determination unit 602 determines that all the object detection results 802 are inappropriate as the training data, excludes the object detection results 802, and does not use the inference result 702 from the frame for the training data.

The training data determination unit 602 may output the inference result 702 having a highest inference accuracy among the object detection results 802 of which the movement amounts Adis to Ndis between frames are smaller than the predetermined movement amount Ldis, as the training data 703 to the training data set generation unit 603. The training data 703 is not limited to the inference result 702 having the highest inference accuracy, and may be an inference result 702 of which the inference accuracy is equal to or greater than a threshold value, and may be an inference result 702 of which the inference accuracy is up to a top M inference accuracy (M is an integer of 1 or more).

The training data determination unit 602 may calculate a detection start point and a detection end point to be output as the training data 703 based on the detection start point and the detection end point accompanying the inference accuracy of each inference model 701 using the magnitude of the inference accuracy as an expected value. Accordingly, the method of calculating the training data 703 to be output by the training data determination unit 602 is not limited.

The training data determination unit 602 may set a threshold value in advance for the inference accuracy, and may exclude the object detection result 802 by determining that the object detection result 802 that does not satisfy the threshold value is inappropriate as the training data 703.

Next, a method of deriving the training data 703 using the skeleton detection result 801 will be described. As illustrated in FIG. 9, the skeleton detection result 801 includes the plurality of skeleton points 900 to 910 and the inference accuracy 923 thereof. Among these skeleton points and the inference accuracy, the training data determination unit 602 calculates a sum of movement amounts between frames of the skeleton points 900 to 910 of the skeleton detection result 801 inferred by the inference models 701A to 701N according to the following formula (2) (a left side of the following formula (2)), and compares the calculated sum of the movement amounts with a predetermined movement amount LSumKey.

[Formula 2]

$$\sum_{i=1}^{10}\{(x_i|_{frame=n-1} - x_i|_{frame=n})^2 + (y_i|_{frame=n-1} - y_i|_{frame=n})^2\} < LSumKey \quad (2)$$

If the calculated sum of the movement amounts is smaller than the movement amount LSumKey, the training data determination unit 602 stores the skeleton detection result 801 as a candidate of the inference result 702 to be output to the training data set generation unit 603. Meanwhile, if the calculated sum of movement amounts is equal to or greater than the movement amount LSumkey, the training data determination unit 602 determines that the skeleton detection result 801 is inappropriate as the training data 703, and excludes the skeleton detection result 801.

In the above formula (2), the training data determination unit 602 calculates the sum of the movement amounts between the adjacent frames, but the training data determination unit 602 may calculate the movement amount between frames using the skeleton points 900 to 910 in several previous frames, and may calculate the movement amount between frames by averaging the movement amounts between frames of a plurality of frames, and the calculation method of the movement amount between frames is not limited.

The training data determination unit 602 may output, the inference result 702 having a highest sum of the inference accuracy 923 among the skeleton detection results 801 in which the sum of the movement amounts between frames is smaller than the movement amount LSumKey, as the training data 703 to the training data set generation unit 603. The training data 703 is not limited to the inference result 702 having the highest sum of the inference accuracy 923, and may be an inference result 702 in which the sum of the inference accuracy 923 is equal to or greater than a threshold value, and may be an inference result 702 in which the sum of the inference accuracy 923 is up to a top M inference accuracy (M is an integer of 1 or more).

The training data determination unit 602 may calculate the skeleton detection result 801 to be output as the training data 703 from the skeleton detection result 801 accompanying the inference accuracy 923 of each inference model 701 using the magnitude of the inference accuracy 923 as an expected value. Accordingly, the method of calculating the training data 703 to be output by the training data determination unit 602 is not limited.

The training data determination unit 602 may not use the skeleton detection result 801 for each inference model 701, and as shown in the following formula (3), the training data determination unit 602 may calculate the movement amount between frames (a left side of the following formula (3)) in unit of the skeleton detection result 801, and compare the calculated movement amounts with a movement amount LKey.

[Formula 3]

$$(x_i|_{frame=n-1} - x_i|_{framre=n})^2 + (y_i|_{frame=n-1} - y_i|_{frame=n})^2 < LKey (0 \le n \le 10) \quad (3)$$

In this case, if the calculated movement amounts are smaller than the movement amount LKey, the training data determination unit 602 stores the skeleton detection result 801 as the candidate of the training data 703 to be output to the training data set generation unit 603. Meanwhile, if the calculated movement amounts are equal to or greater than the movement amount Lkey, the training data determination unit 602 determines that the skeleton detection result 801 is inappropriate as the training data 703, and excludes the skeleton detection result 801. Specifically, for example, the training data determination unit 602 may exclude the skeleton detection result 801 even if one of the calculated movement amounts is equal to or greater than the movement amount LKey, and may exclude the skeleton detection result 801 if a predetermined number or more of the calculated movement amounts is equal to or larger than the movement amount LKey.

In the above formula (3), the training data determination unit 602 calculates the movement amounts between the adjacent frames, but the training data determination unit 602 may calculate the movement amount between frames using the skeleton points 900 to 910 in several previous frames, and may calculate the movement amount between frames by averaging the movement amounts between frames of a plurality of frames, and the calculation method of the movement amount between frames is not limited.

Accordingly, the inference result 702 having the highest sum of the inference accuracy among the object detection results 802 in which the movement amounts calculated in unit of the skeleton detection result 801 are smaller than the movement amount LKey may be output as the training data 703 to the training data set generation unit 603. The training data determination unit 602 may calculate the skeleton detection result 801 to be output as the training data 703 from the skeleton detection result 801 accompanying the inference accuracy 923 of each inference model 701 using the magnitude of the inference accuracy 923 as an expected value. Accordingly, the method of calculating the training data 703 to be output by the training data determination unit 602 is not limited.

As shown in the following formula (4), the training data determination unit 602 may set a threshold value LS in advance for the inference accuracy 923 (Sn=S0 to S10), and may exclude the skeleton detection result 801 by determining that the skeleton detection result 801 that does not satisfy the predetermined threshold value LS is inappropriate as the training data 703.

[Formula 4]

$$S_n > LS (0 \leq n \leq 10) \qquad (4)$$

Specifically, for example, the training data determination unit 602 may exclude the skeleton detection result 801 if even one inference accuracy Sn does not satisfy the threshold value LS, and may exclude the skeleton detection result 801 if a predetermined number or more of the inference accuracy Sn does not satisfy the threshold value LS.

<Operation Sequence Example of Data Analysis System>

FIG. 10 is a sequence diagram illustrating an operation sequence example 1 of the data analysis system according to the first embodiment. The operation sequence example 1 is an operation sequence example in which the central management device 101 controls the edge system 103 according to information from the edge system 103.

The edge device 132 acquires the analysis target data 700 by the data acquisition unit 501 (step S1001), and executes the inference by the edge information inference unit 503 (step S1002). Then, the edge device 132 transmits the inference result to the edge management device 131 (step S1003).

The edge management device 131 determines, by the edge management unit 506, the abnormality of the analysis environment based on the inference result (step S1004), and transmits the management data indicating that there is an abnormality to the central management device 101 (step S1005) when it is determined that there is an abnormality.

The central management device 101 generates, based on the management data, the control data for controlling the edge system 103 (step S1006), and transmits the control data to the edge management device 131 (step S1007). The edge management device 131 executes the process corresponding to the control data from the central management device 101 by the edge management unit 506 (step S1008). For example, as described above, the edge management unit 506 notifies the crew member of the stop of the train or executes the control of stopping the operation.

FIG. 11 is a sequence diagram illustrating an operation sequence example 2 of the data analysis system 100 according to the first embodiment. The operation sequence example 2 is an operation sequence example in which the training data is generated based on the analysis target data 700 from the edge system 103, the learning model 704 is further generated, and the learning model 704 is returned to the edge device 132. The operation sequence example 2 may be executed at the same timing as in the operation sequence example 1 at which the analysis target data 700 is acquired, or may be executed at a different timing.

The edge device 132 acquires the analysis target data 700 by the data acquisition unit 501 (step S1001), and transmits the acquired analysis target data 700 to the edge management device 131 by the accumulation control unit 502 (step S1102). The edge management device 131 accumulates the analysis target data 700 from the edge device 132 by the data accumulation unit 504 (step S1103). The edge management device 131 transmits the analysis target data 700 to the generation device 102 (step S1104).

Upon receiving the analysis target data 700, the generation device 102 executes the inference by the training data inference unit 601 (step S1105). Then, the generation device 102 executes a learning process (step S1106). Details of the learning process (step S1106) will be described later with reference to FIG. 12. After the learning process (step S1106), the generation device 102 transmits the learning model 704 obtained by the learning process (step S1106) to the edge management device 131 (step S1107).

Upon receiving the learning model 704, the edge management device 131 deploys the learning model 704 in the edge device 132 that is a transmission source of the analysis target data 700 (step S1108). Accordingly, the edge device 132 can execute an edge inference of FIG. 10 by using the deployed learning model 704.

Figure 12:
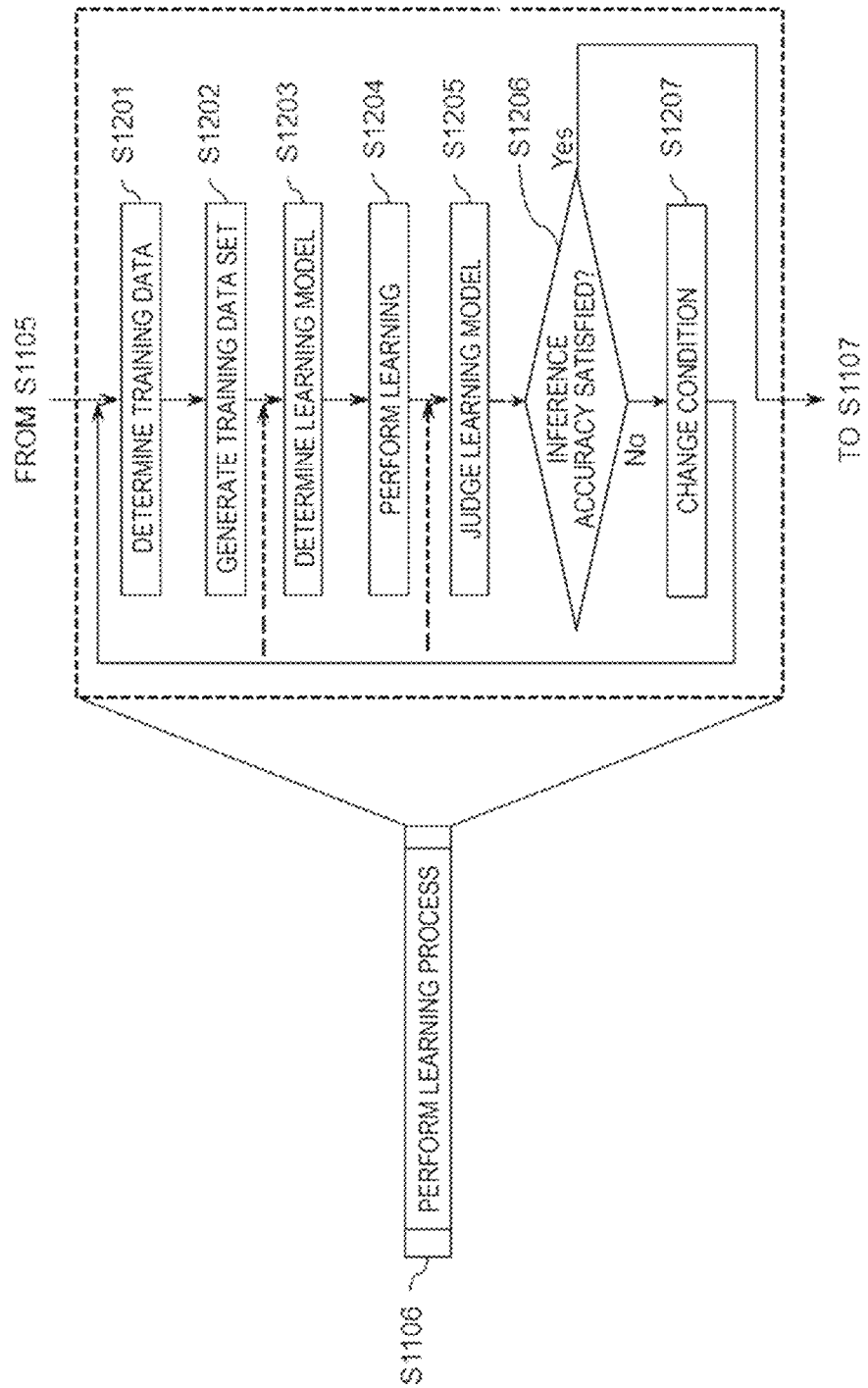
FIG. 12 is a flowchart illustrating a detailed process procedure example of a learning process (step S1106) illustrated in FIG. 11.

FIG. 12 is a flowchart illustrating a detailed process procedure example of the learning process (step S1106) illustrated in FIG. 11. After step S1105, the generation device 102 determines, by the training data determination unit 602, whether each of the plurality of inference results 702A to 702N from the training data inference unit 601 is appropriate as training data, and outputs the inference result 702 determined to be appropriate to the training data set generation unit 603 as the training data. The training data determination unit 602 outputs the specific inference model 701 that is a generation source of the training data to the learning model determination unit 604 (step S1201).

Next, the generation device 102 aggregates the training data sequentially received from the training data determination unit 602 by the training data set generation unit 603, and outputs the aggregated training data as a training data set to the learning unit 605 (step S1202).

Then, the generation device 102 determines the learning model 704 from the plurality of specific inference models 701 sequentially received from the training data determination unit 602 by the learning model determination unit 604 (step S1203). Next, the generation device 102 trains, by the learning unit 605, the learning model 704, such that the training data set can be inferred, by machine learning such as deep learning by using the training data set generated by the training data set generation unit 603 and the learning model 704 determined by the learning model determination unit 604, and the generation device 102 outputs the learning model 704 to the learning model judgment unit 606 (step S1204).

Then, the generation device 102 calculates, by the learning model judgment unit 606, the inference accuracy of the learning model 704 when the test data is used, and judges whether the learning model 704 satisfies the predetermined inference accuracy by using the inference accuracy and the loss function from the learning unit 605 (step S1205) If the predetermined inference accuracy is satisfied (step S1206: Yes), the process proceeds to step S1107.

Meanwhile, if the learning model 704 does not satisfy the predetermined inference accuracy (step S1206: No), the generation device 102 outputs data indicating that fact to the training data determination unit 602 by the learning model judgment unit 606. In this case, the generation device 102 changes, by the training data determination unit 602, the determination method to a determination method different from the determination method used for the previous determination (step S1207), and the process returns to step S1201.

Accordingly, the generation device 102 can execute the training data determination with a new determination method by the training data determination unit 602 (step S1201). Further, instead of changing the determination method, a learning model determination method (step S1203) or a learning model judgment method may be changed.

Accordingly, according to the first embodiment, quality of the training data set can be improved by the generation device 102. A generation speed of a high-quality training data set can be improved by the generation device 102. Accordingly, continuous performance improvement of the data analysis system 100 using machine learning can be achieved. Regarding the analysis environment, the first embodiment can be implemented in the factory 300 in which work of the work robot 302 or the worker 301 is monitored, and can also be implemented in a transfer means such as the train 401.

Second Embodiment

A second embodiment will be described focusing on differences from the first embodiment. Points common to the first embodiment are denoted by the same reference numerals, and description thereof is omitted. In the second embodiment, the learning models 704 deployed in the plurality of edge devices 132 installed inside the train 401 are different depending on the train 401 and positions where the edge devices 132 are deployed. For example, the learning model 704 deployed in the edge device 132 installed in a female dedicated vehicle in the train 401 is different from the learning model 704 deployed in the edge device 132 installed in other general vehicles.

Figure 13:
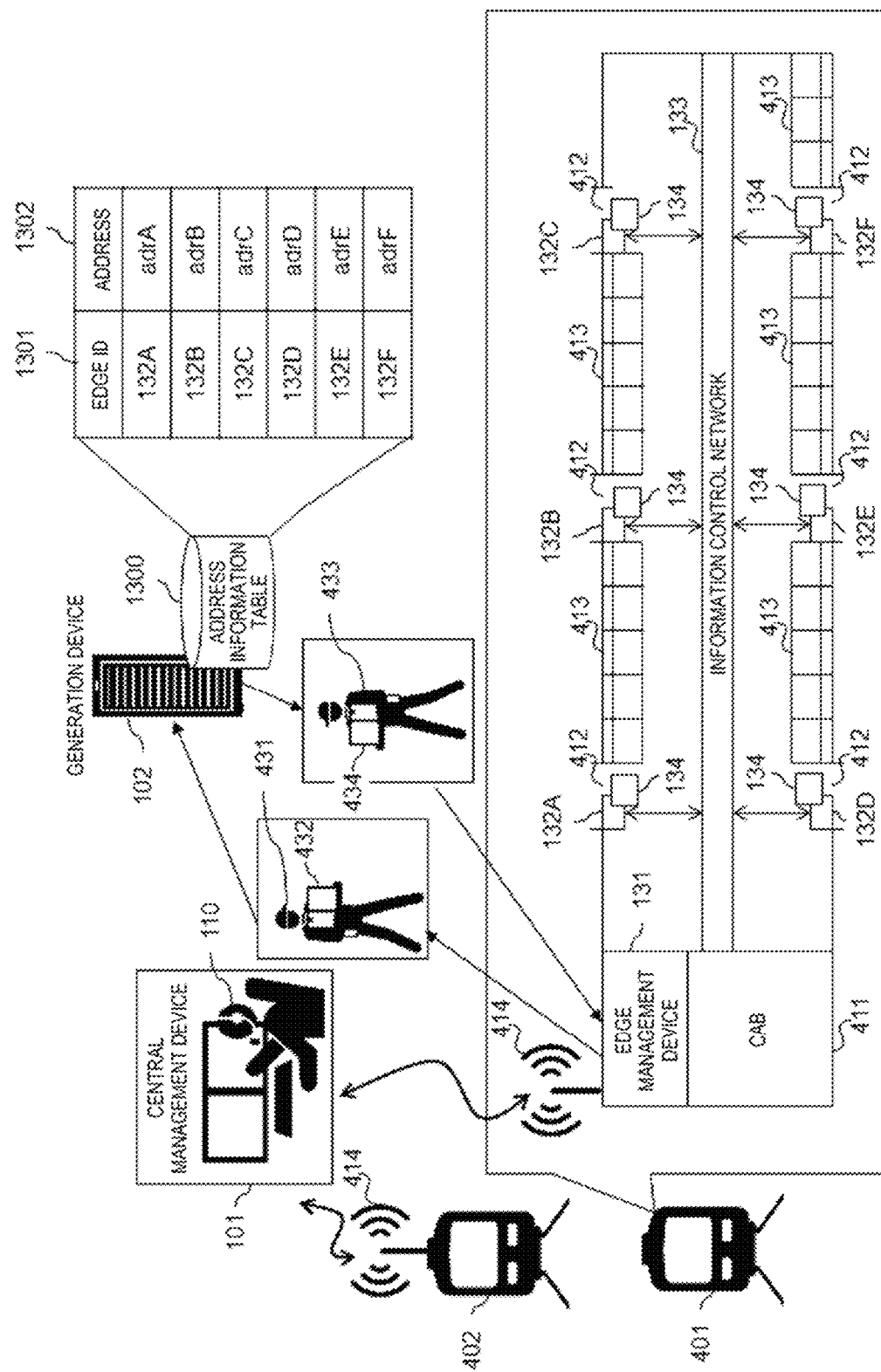
FIG. 13 is a diagram illustrating an analysis environment example 3.

FIG. 13 is a diagram illustrating an analysis environment example 3. The analysis environment example 3 is in the train 401 as the analysis environment example 2. The plurality of edge devices 132 are, for example, six edge devices 132A to 132F.

The generation device 102 includes an address information table 1300. The address information table 1300 includes edge IDs 1301 and addresses 1302 as fields. The edge ID 1301 is identification information for uniquely specifying the edge device 132. In FIG. 13, a reference numeral of the edge device 132 is used as the edge ID 1301. The addresses 1302 are unique physical addresses adrA to adrF assigned to the edge devices 132.

The learning model 704 deployed in the edge information inference unit 503 may be different depending on a deviation of the analysis target data 700 acquired by the sensor 134. Specifically, for example, different learning models 704 may be deployed for each deviation of the analysis target data 700. Further, different learning models 704 may be deployed depending on the installation positions of the edge device 132 and the sensor 134 in the vehicle.

Since an overall learning time increases as the type of the learning model 704 to be deployed increases, the type of the learning model 704 may be limited as the overall learning time increases. In this case, different learning models 704 may be deployed depending on the deviation of the analysis target data 700 among the limited types.

Figure 14:
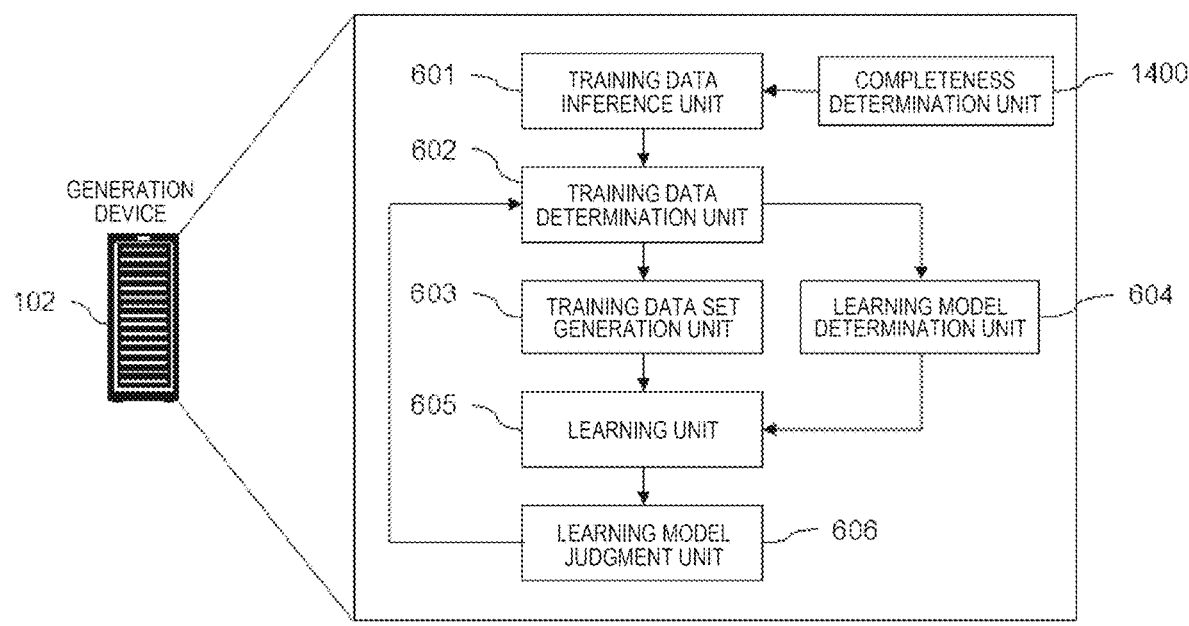
FIG. 14 is a block diagram illustrating a functional configuration example of a generation device according to a second embodiment.

FIG. 14 is a block diagram illustrating a functional configuration example of the generation device 102 according to the second embodiment. A difference from the generation device 102 according to the first embodiment shown in FIG. 6 is that the generation device 102 according to the second embodiment includes a completeness determination unit. Specifically, the completeness determination unit has, for example, a function implemented by causing the processor 201 to execute a program stored in the storage device 202.

In the second embodiment, the accumulation control unit 502 of the edge device 132 accumulates the analysis target data 700 detected by the sensor 134 in the data accumulation unit 504 of the edge management device 131 in association with the address 1302.

A completeness determination unit 1400 analyzes the deviation of the analysis target data 700 from the edge management device 131 for each address 3102 of the edge device 132. Specifically, for example, the completeness determination unit 1400 includes an age inference model and a gender inference model, and inputs the analysis target data 700 to these models. The completeness determination unit 1400 determines whether there is a certain deviation in features indicated by analysis results from the age inference model and the gender inference model, such as age and gender, for each address 1302. Then, the completeness determination unit 1400 associates information indicating the presence or absence of a certain deviation with the address 1302, and outputs the analysis target data 700 to the training data inference unit 601.

The training data set generation unit 603 generates a training data set by distinguishing an address 1302 having a certain deviation and an address 1302 having no certain deviation. The learning model determination unit 604 also determines the learning model 704 from a plurality of specific inference models sequentially received from the training data determination unit 602 by distinguishing the address 1302 having a certain deviation and the address 1302 having no certain deviation.

The learning unit 605 also trains the learning model 704 such that the training data set can be inferred, by distinguishing the address 1302 having a certain deviation and the address 1302 having no certain deviation, and outputs the learning model 704 to the learning model judgment unit 606. The learning unit 605 generates a loss function by distinguishing the address 1302 having a certain deviation and the address 1302 having no certain deviation, and outputs the loss function to the learning model judgment unit 606.

The learning model judgment unit 606 holds test data that is not used in training in the learning unit 605, by distinguishing the address 1302 having a certain deviation and the address 1302 having no certain deviation. The learning model judgment unit 606 judges whether the learning model 704 satisfies predetermined inference accuracy by using inference accuracy of the learning model 704 using the test data and the loss function, and distinguishing the address 1302 having a certain deviation and the address 1302 having no certain deviation.

If the predetermined inference accuracy is satisfied, the learning model judgment unit 606 outputs the learning model 704 to the learning model deployment unit 505 of the edge management device 131. Meanwhile, if the learning model 704 does not satisfy the predetermined inference accuracy, the learning model judgment unit 606 outputs data indicating that fact to the training data determination unit 602. In this case, the training data determination unit 602 determines whether each of the plurality of pieces of training data from the training data inference unit 601 is appropriate as training data by a method different from a method used in the previous determination.

The generation device 102 transmits the learning model 704 to the learning model deployment unit 505 of the edge management device 131. The learning model deployment unit 505 deploys the generated learning model 704 in the edge device 132 that acquired the analysis target data 700 that is a generation source of the training data set.

That is, when the deviation is found in the features indicated by the age inference model and the gender inference model for the analysis target data 700 obtained from the edge device 132, the generation device 102 generates the learning model 704 using only the analysis target data 700 acquired from the edge device 132, and the edge management device 131 deploys the learning model 704 only in the edge device 132. In this manner, inference precision of the edge device 132 having other features can be prevented from being adversely affected by the edge device 132 that acquires the analysis target data 700 with a high deviation, and the inference precision of the edge device 132 that acquires the analysis target data 700 having a deviation can be improved.

Although the age inference model and the gender inference model are applied to the completeness determination unit 1400, an attribute handled by the model for generating the analysis result is not limited to the age and the gender, and a model for inference or calculation of a time, a weather, or a total light amount at which the analysis target data 700 is acquired may be applied.

Accordingly, according to the second embodiment, even when the deviation occurs in the features of the analysis target data 700 acquired according to the position of the edge device 132 to be deployed, inference precision of the other edge device 132 can be prevented from being adversely affected by the edge device 132 that acquires the analysis target data 700 with a high deviation, and the inference precision of the edge device 132 that acquires the analysis target data 700 having a deviation can be improved.

The invention is not limited to the above embodiments and includes various modifications and equivalent configurations within the spirit of the claims. For example, the above embodiments have been described in detail in order to make the invention easy to understand, and the invention is not necessarily limited to those which have all the configurations described. Further, a part of the configurations of an embodiment may be replaced with configurations of other embodiments. The configuration of another embodiment may be added to the configuration of the certain embodiment. Further, a part of the configuration of each embodiment may be added to, deleted from, or replaced with another configuration.

Further, a part or all of the configurations, functions, processing units, processing methods described above and the like may be implemented by hardware, for example by designing with an integrated circuit, or may be implemented by software, for example, by the processor 201 interpreting and executing a program that implements each function.

Data such as a program, a table, and a file that implements each function can be stored in a storage device such as a memory, a hard disk, and a solid state drive (SSD), or a recording medium such as an integrated circuit (IC) card, an SD card, and a digital versatile disc (DVD).

Control lines and data lines are shown in consideration of the necessary for description, and not all the control lines and data lines are necessarily shown in a product. In fact, it may be considered that almost all the configurations are connected with one another.

The invention claimed is:

1. A generation device, comprising:
a processor configured to execute a program; and
a storage device configured to store the program, wherein the processor is configured to execute;
an inference process of inputting analysis target data, which is image data including a plurality of time-series frames, to a plurality of inference models and outputting a plurality of inference results related to an object included in the analysis target data from the plurality of inference models;
a determination process of determining, based on a movement amount of a skeleton point of a skeleton of the object, between a first frame and a second frame in each of the plurality of inference results, wherein the skeleton indicates a shape of the object, one of the plurality of inference results output by the inference process, for which the movement amount is below a predetermined threshold, as a specific inference result; and
a generation process of generating a training data set including the specific inference result determined by the determination process and the analysis target data.

2. The generation device according to claim 1, wherein in the determination process, the processor determines the specific inference result from the plurality of inference results based on a movement amount of the object between a first frame and a second frame in each of the plurality of inference results.

3. The generation device according to claim 1, wherein in the determination process, the processor determines the specific inference result from the plurality of inference results based on inference accuracy of the object included in each of the plurality of inference results.

4. The generation device according to claim 1, wherein in the determination process, the processor determines the specific inference result from the plurality of inference results based on inference accuracy of the skeleton point of the skeleton of the object, included in each of the plurality of inference results.

5. The generation device according to claim 1, wherein in the determination process, when a classification of the object included in each of the plurality of inference results is different, the processor excludes an inference result including a classification of a minority from the plurality of inference results.

6. The generation device according to claim 1, wherein the processor is configured to execute;
a determination process of determining a specific inference model from the plurality of inference models based on the number of outputs of the specific inference result in each of the inference models.

7. The generation device according to claim 6, wherein the processor is configured to execute;
a learning process of training the specific inference model, which is determined by the determination process, by using the training data set generated by the generation process, and outputting the specific inference model as a learning model.

8. The generation device according to claim 7, wherein the processor is configured to execute:
a judgment process of judging whether inference accuracy included in a learning result, which is obtained as a result of inputting test data that is not input to the plurality of inference models to the learning model output by the learning process, is equal to or higher than predetermined inference accuracy.

9. The generation device according to claim 8, wherein in the judgment process, when the inference accuracy included in the learning result is equal to or higher than the predetermined inference accuracy, the processor outputs the learning model.

10. The generation device according to claim 8, wherein in the determination process, when it is judged by the judgment process that the inference accuracy included in the learning result is not equal to or higher than the predetermined inference accuracy, the processor determines the specific inference result, from a remaining inference result that is not determined as the specific inference result among the plurality of inference results, based on the remaining inference result.

11. A data analysis system, comprising:
a generation device, including a processor configured to execute a program and a storage device configured to store the program, the generation device being configured to generate a learning model; and
an edge system, including a plurality of edge devices, each of which includes a sensor, and an edge management device that manages the plurality of edge devices, the edge system being configured to acquire analysis target data, wherein
the generation device is configured to execute:
a first inference process of inputting first analysis target data, which is image data including a plurality of time-series frames, to a plurality of inference models and outputting a plurality of inference results related to an object included in the first analysis target data from the plurality of inference models;
a determination process of determining, based on a movement amount of a skeleton point of a skeleton of the object, between a first frame and a second frame in each of the plurality of inference results, wherein the skeleton indicates a shape of the object, one of the plurality of inference results output by the first inference process, for which the movement amount is below a predetermined threshold, as a specific inference result;
a generation process of generating a training data set including the specific inference result determined by the determination process and the analysis target data;
a determination process of determining a specific inference model from the plurality of inference models based on the number of outputs of the specific inference result in each of the inference models; and
a learning process of training the specific inference model, which is determined by the determination process, by using the training data set generated by the generation process, and outputting the specific inference model as a learning model; and the edge system is configured to execute:
an acquisition process of acquiring the first analysis target data and second analysis target data from an analysis environment;
an output process of outputting the first analysis target data acquired by the acquisition process; and
a second inference process of inputting the second analysis target data acquired by the acquisition process to the learning model output by the learning process and outputting an inference result related to an object included in the second analysis target data from the learning model.

12. A generation method to be executed by a generation device including a processor configured to execute a program, and a storage device configured to store the program, the generation method comprising:
the processor executing:
an inference process of inputting analysis target data, which is image data including a plurality of time-series frames, to a plurality of inference models and outputting a plurality of inference results related to an object included in the analysis target data from the plurality of inference models;
a determination process of determining, based on a movement amount of a skeleton point of a skeleton of the object, between a first frame and a second frame in each of the plurality of inference results, wherein the skeleton indicates a shape of the object, one of the plurality of inference results output by the inference process, for which the movement amount is below a predetermined threshold, as a specific inference result; and
a generation process of generating a training data set including the specific inference result determined by the determination process and the analysis target data.

13. A non-transitory computer-readable medium storing a generation program for causing a processor to execute:
an inference process of inputting analysis target data, which is image data including a plurality of time-series frames, to a plurality of inference models and outputting a plurality of inference results related to an object included in the analysis target data from the plurality of inference models;
a determination process of determining, based on a movement amount of a skeleton point of a skeleton of the object, between a first frame and a second frame in each of the plurality of inference results, wherein the skeleton indicates a shape of the object, one of the plurality of inference results output by the inference process, for which the movement amount is below a predetermined threshold, as a specific inference result; and
a generation process of generating a training data set including the specific inference result determined by the determination process and the analysis target data.

* * * * *